(12) United States Patent
Taylor

(10) Patent No.: US 7,428,245 B1
(45) Date of Patent: Sep. 23, 2008

(54) SPLIT MEDIUM ACCESS AND CONTROL LAYER COMMUNICATIONS SYSTEM

(75) Inventor: James Larry Taylor, Epone (FR)

(73) Assignee: Staccato Communications, Inc., San Diego, CA (US)

( * ) Notice: Subject to any disclaimer, the term of this patent is extended or adjusted under 35 U.S.C. 154(b) by 632 days.

(21) Appl. No.: 10/892,814

(22) Filed: Jul. 15, 2004

Related U.S. Application Data (60) Provisional application No. 60/491,772, filed on Aug. 1, 2003.

(51) Int. Cl.
*H04L 12/50* (2006.01)
(52) U.S. Cl. ...................... 370/469; 370/471
(58) Field of Classification Search ............... 370/469, 370/471, 473, 474, 465, 466, 467, 438

See application file for complete search history.

(56) References Cited

U.S. PATENT DOCUMENTS

| | | | | |
|---|---|---|---|---|
| 5,257,384 A * | 10/1993 | Farrand et al. | ............... | 710/105 |
| 5,448,702 A * | 9/1995 | Garcia et al. | ................ | 710/100 |
| 5,526,479 A * | 6/1996 | Barstow et al. | ............. | 345/473 |
| 5,606,717 A * | 2/1997 | Farmwald et al. | ............. | 710/36 |
| 5,651,002 A * | 7/1997 | Van Seters et al. | .......... | 370/392 |
| 6,847,654 B2 * | 1/2005 | Zegelin | ...................... | 370/463 |

\* cited by examiner

*Primary Examiner*—Chi H. Pham
*Assistant Examiner*—Alexander O. Boakye
(74) *Attorney, Agent, or Firm*—Van Pelt, Yi & James LLP (57) ABSTRACT

A MAC layer system is disclosed. The MAC layer system comprises an upper MAC portion wherein the upper MAC portion is dependent on a MAC protocol and a lower MAC portion wherein the lower MAC portion is independent of the MAC protocol.

19 Claims, 9 Drawing Sheets

SPLIT MEDIUM ACCESS AND CONTROL LAYER COMMUNICATIONS SYSTEM

CROSS REFERENCE TO RELATED APPLICATIONS

This application claims priority to U.S. Provisional Patent Application No. 60/491,772 entitled PROTOCOL INDEPENDENT INTERFACE filed Aug. 1, 2003 which is incorporated herein by reference for all purposes.

FIELD OF THE INVENTION

The present invention relates generally to communication systems. More specifically, a split medium access and control (MAC) layer system is disclosed.

BACKGROUND OF THE INVENTION

Figure 1:
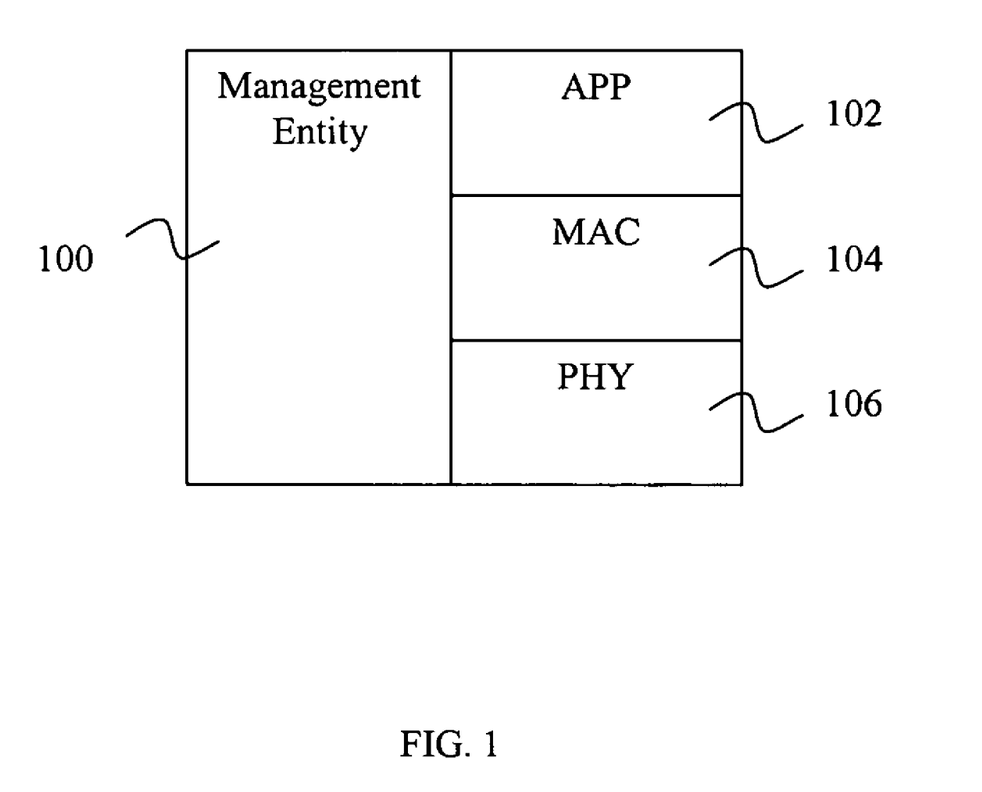
FIG. 1 is a block diagram illustrating a communications system.

Communication systems, such as high-speed wireless local area networks, often specify standards for the different layers of the systems. FIG. 1 is a block diagram illustrating a communications system. The communications system is made up of four subsystems: management entity 100, applications layer (APP) 102, medium access and control layer (MAC) 104, and physical layer (PHY) 106. The physical layer transmits and receives bits of information by modulating and demodulating the bits of information on a physical channel. In some embodiments, the physical channel is a wireless personal area network channel that transmits and receives radio wave signals at 3 to 5 GHz. In other embodiments, the physical channel could be another type of wireless communications channel, a wired communications channel, or a fiber optic channel. The medium access and control layer encrypts and decrypts information and also generates and verifies bits of information into defined data structures. In some embodiments, the defined data structures are packets. The applications layer incorporates all other communications functions and the application which initiates and consumes the data exchanged across the MAC/PHY layer and over the physical medium. In some embodiments the applications layer incorporates intermediate communications protocol layers such as those defined in Open Systems or IEEE standards. The management entity coordinates between the different layers. In some embodiments, the management entity coordinates conditions like reset and sleep.

Figure 2:
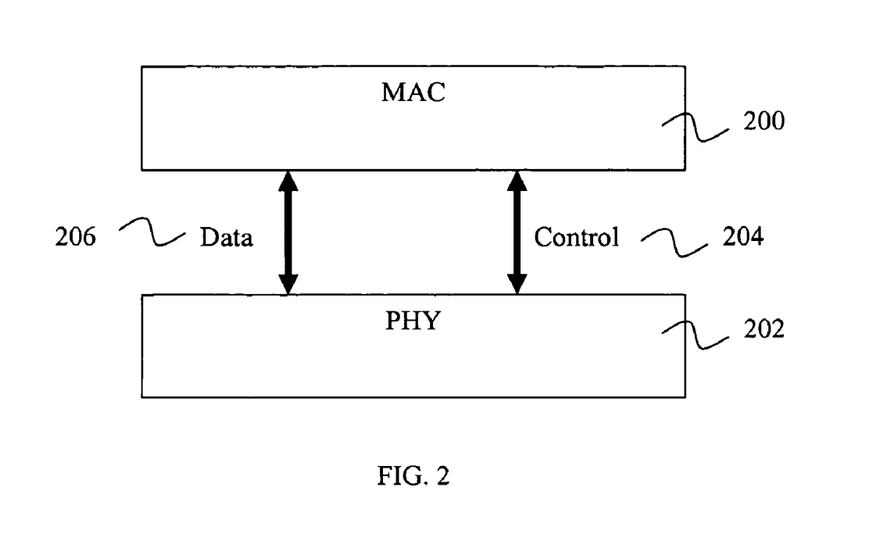
FIG. 2 is a block diagram illustrating the interface between the MAC layer and the PHY layer.

FIG. 2 is a block diagram illustrating the interface between the MAC layer and the PHY layer. This interface is a hardware interface between MAC layer 200 and PHY layer 202. Data information 206 and control information 204 are passed over this interface. This interface is specific to the hardware configuration of the MAC and of the PHY. Therefore, if the MAC functionality changes because of a standards change, then the MAC hardware would potentially need to be redone.

The standards for the different layers of communications systems change over time and need to be supported by the hardware implementation of the system. Also, the hardware systems may be required to support multiple coexisting standards as well. Since hardware development times are long, it would be better to have universal interfaces between layers to accommodate later changes to a standard with the developed hardware. In particular, MAC layer standards change or multiple MAC layer standards need to be supported by a communications system. However, PHY layer designs have hardware and information interfaces that have long development times. PHY layer designs can be made obsolete if the MAC layer standard changes or the multiple MAC layer standards cannot be supported by the hardware and information interfaces.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A split medium access (MAC) layer system is disclosed, where the MAC layer is split into an upper MAC portion, which is able to support changes to MAC standards, and a lower MAC portion, which has a stable hardware and information structure interface to the physical (PHY) layer. Also, the interface between the upper MAC portion and the lower MAC portion is universal from both a hardware and information structure perspective. This allows PHY layer design and lower MAC layer design to not be made obsolete even if there are changes to the MAC layer standard or support for multiple standards is required.

Figure 3:
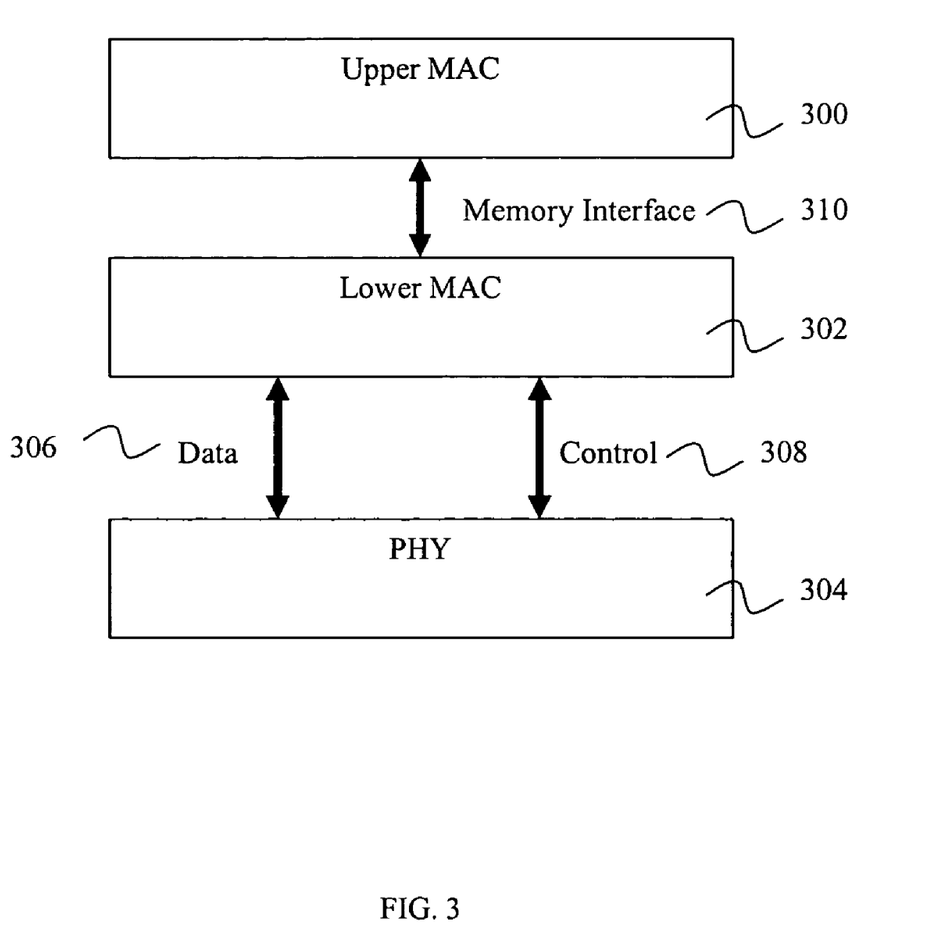
FIG. 3 is a block diagram illustrating a split layer MAC and the interfaces between an upper MAC portion and lower MAC portion and a PHY layer.

FIG. 3 is a block diagram illustrating a split layer MAC and the interfaces between an upper MAC portion and lower MAC portion and a PHY layer. The interface between lower MAC portion 302 and PHY layer 304 is a hardware interface. Data information 306 and control information 308 are passed over this interface. This interface is specific to the hardware configuration of the lower MAC portion and of the PHY. The interface between upper MAC portion 300 and lower MAC portion 302 is via memory interface 310. Since memory interfaces are generally uniform, this configuration allows for different upper MAC portions, and therefore different upper MAC portion protocols, to interface to the same lower MAC portion and PHY layer components without changing the hardware interfaces. Thus, only the upper MAC portion is dependent on the MAC protocol; the lower MAC portion is independent of the MAC protocol. Having a universal interface information structure also makes the upper MAC to lower MAC interface universal. In some embodiments, upper MAC portion functionality is performed using software which enables flexibility. In some embodiments, lower MAC portion functionality is performed using hardware which enables faster performance.

A split medium access (MAC) layer system avoids the need to redesign the lower MAC portion of the MAC and the PHY layer if the MAC layer standard changes or multiple MAC standards need to be supported. The MAC layer is split into an upper MAC portion, which is able to support changes to MAC standards, and a lower MAC portion, which has a stable hardware and information structure interface to the physical (PHY) layer. Also, the interface between the upper MAC portion and the lower MAC portion can be universal from both a hardware and information structure perspective.

Figure 4:
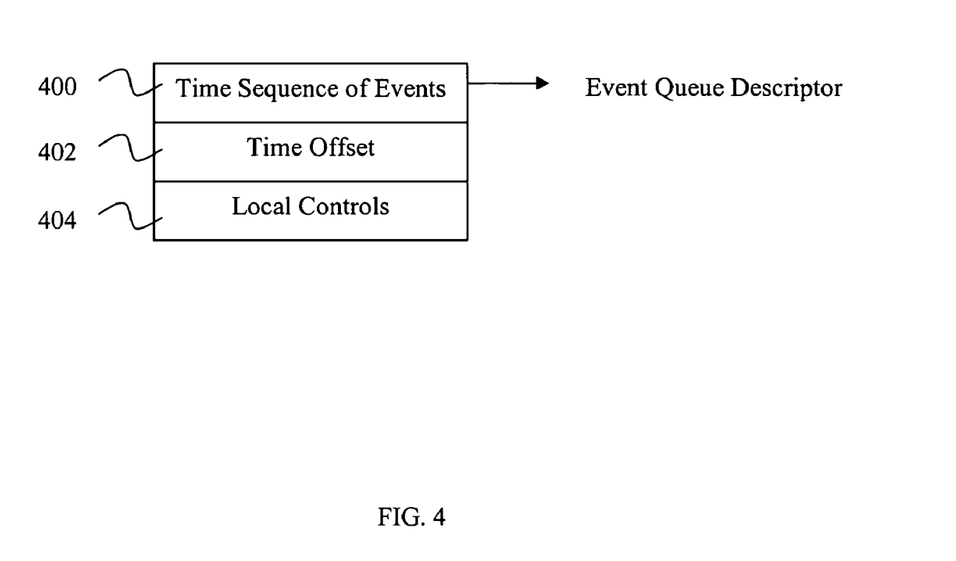
FIG. 4 is a block diagram illustrating a universal interface information structure for communicating between the upper MAC portion and lower MAC portion.

FIG. 4 is a block diagram illustrating a universal interface information structure for communicating between the upper MAC portion and lower MAC portion. This information structure contains time sequence of events 400, time offset 402, and local controls 404. The time sequence of events is described using an event queue descriptor. The time offset synchronizes the upper MAC portion and the lower MAC portion. The local controls allow for commands such as standby or reset. The time offset 402 is set to synchronize beacon and time sequence of event time references. In some embodiments, the time offset may be adjusted so that the start of the superframe described by the beacon is time zero.

Figure 5:
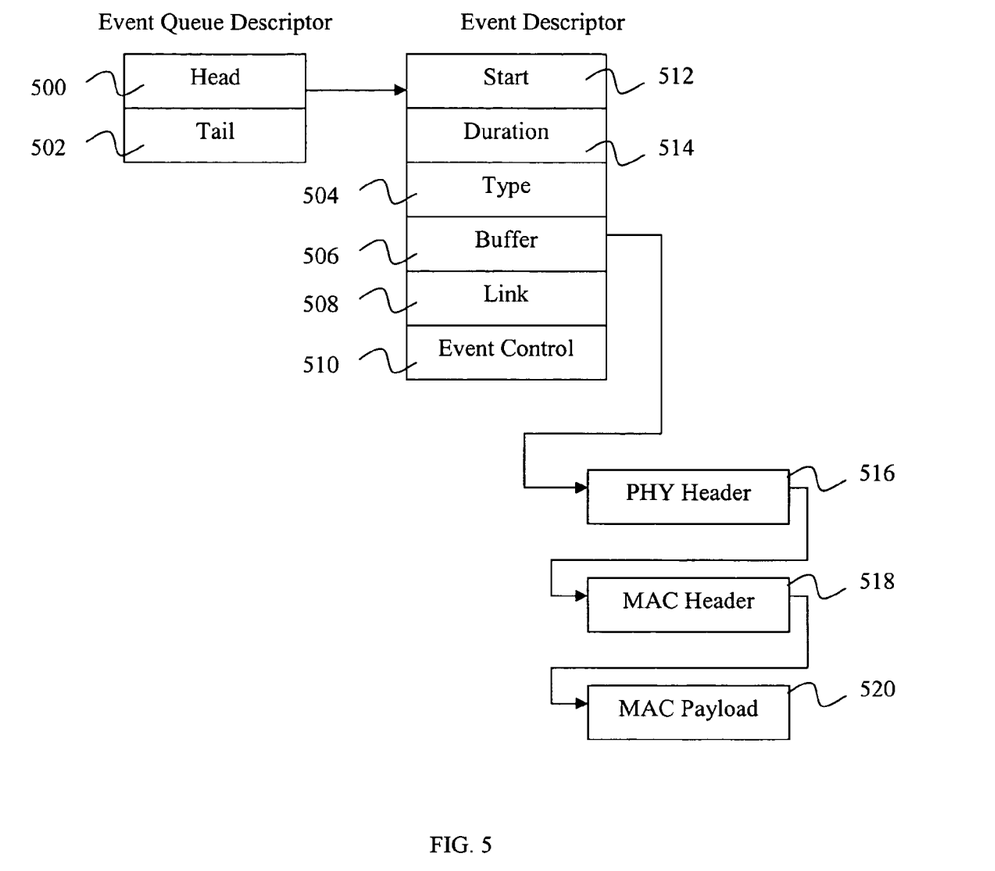
FIG. 5 is a block diagram illustrating an event queue descriptor information structure, an event descriptor information structure, and a buffer information structure.

FIG. 5 is a block diagram illustrating an event queue descriptor information structure, an event descriptor information structure, and a buffer information structure. The event queue descriptor information structure contains head 500 and tail 502. The head points to the first event descriptor and the tail points to the last event descriptor. The event descriptor contains start 512, duration 514, type 504, buffer 506, link 508, and event control 510. Start 512 defines the time for starting the event. Duration 514 defines the duration of the event. Type 504 describes the type of event. Types of events may include, for example, transmit, receive, sleep, or broadcast. Buffer 506 points to a data information structure containing PHY header 516, MAC header 518, and MAC payload 520. In some embodiments, buffer 506 is made available between the upper MAC portion and the lower MAC portion before the entire data information structure has been filled. For example, the upper MAC portion accesses the buffer when a header has been loaded so that the upper MAC portion can process the information in the buffer in a timely manner. Link 508 points to the next event descriptor. Event control 510 can be a condition such as sense before transmit.

To show the flexibility of the interface information structure to handle different MAC standard protocols, two configurations are described: a simple Aloha MAC protocol and a time division multiple access, 802.15.3, MAC protocol.

Figure 6:
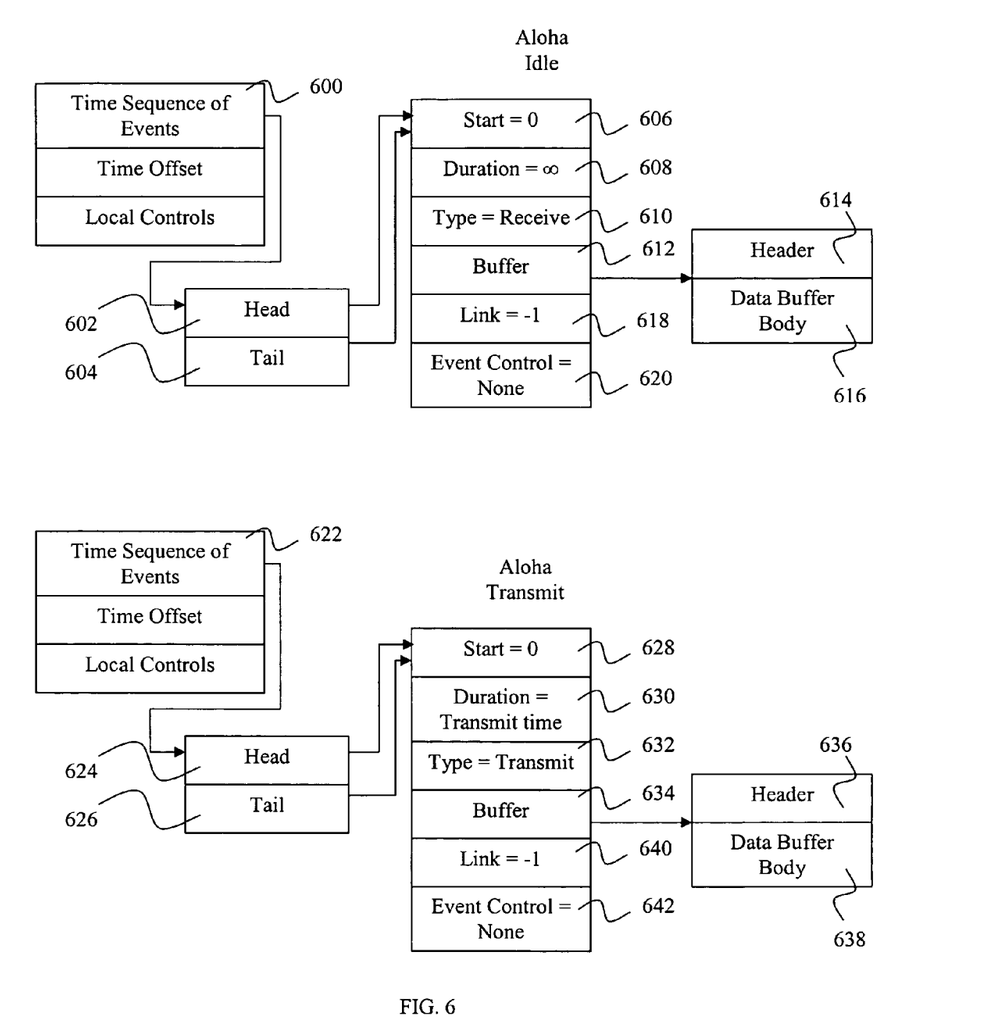
FIG. 6 illustrates the interface information structure for the Aloha MAC protocol.

FIG. 6 illustrates the interface information structure for the Aloha MAC protocol. There are two states for the Aloha MAC protocol: Aloha Idle and Aloha Transmit. For Aloha Idle, time sequence of events 600 points to the event queue descriptor containing head 602 and tail 604. Both head 602 and tail 604 point to start 606 at time 0. Duration 608 is infinitely long. Type 610 is receive. Buffer 612 points to header 614 and data buffer body 616. Link 618 is −1 indicating that there are no other event descriptors. There is a null entry for Event control 620. For Aloha Transmit, time sequence of events 622 points to the event queue descriptor containing head 624 and tail 626. Both head 624 and tail 626 point to start 628 at time 0. Duration 630 is the transmit time. Type 632 is transmit. Buffer 634 points to header 636 and data buffer body 638. Link 640 is −1 indicating that there are no other event descriptors. There is a null entry for Event control 642.

Figure 7:
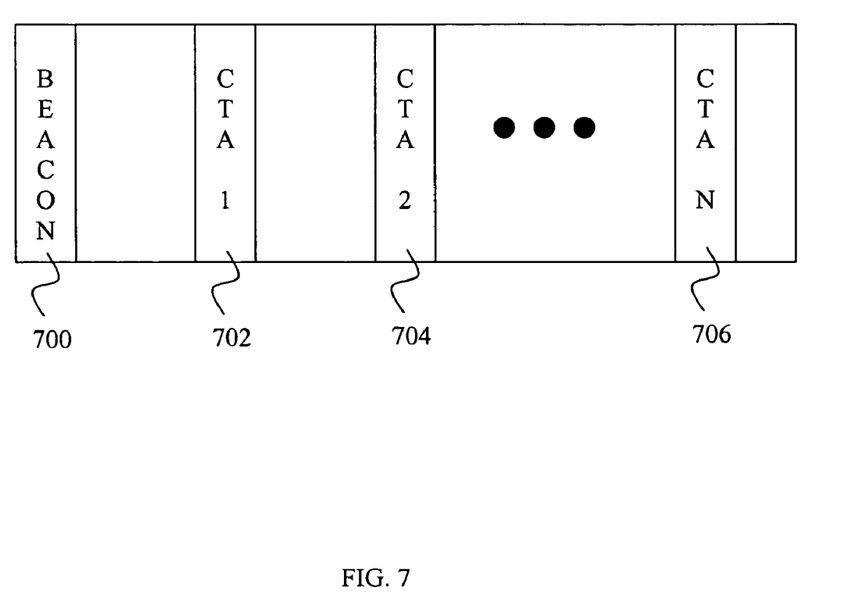
FIG. 7 is a block diagram illustrating the superframe structure described by the beacon information structure for the institute of electrical and electronics engineers standard 802.15.3.

FIG. 7 is a block diagram illustrating the beacon information structure for the institute of electrical and electronics engineers standard 802.15.3. The beacon information structure is an example of a structure used in a time division multiple access communications system. The beacon information structure contains beacon 700, channel time allocation (CTA) 1 702, CTA 2 704, and up to CTA N 706.

Figure 8:
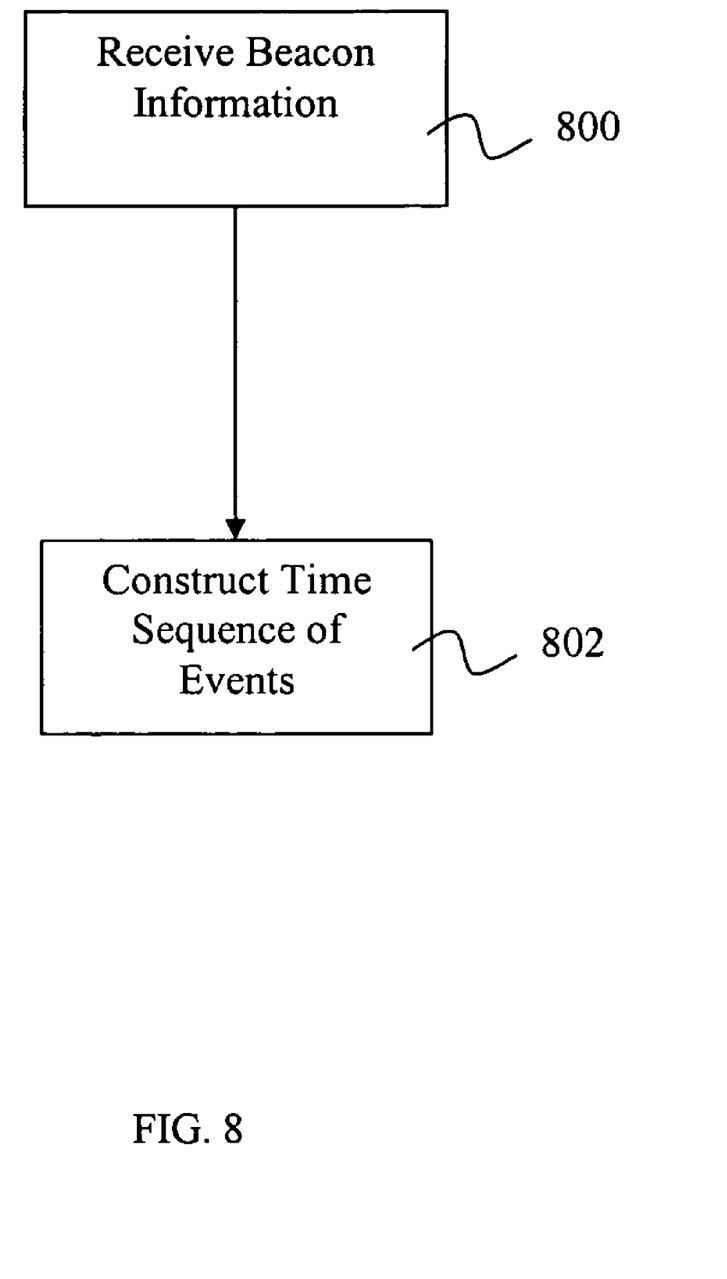
FIG. 8 is a flow diagram illustrating the processing steps for generating the time sequence of events for the standard 802.15.3.

FIG. 8 is a flow diagram illustrating the processing steps for generating the time sequence of events for the standard 802.15.3. In step 800, the beacon information structure is received. In step 802, the beacon information is used to construct the time sequence of events.

Figure 9:
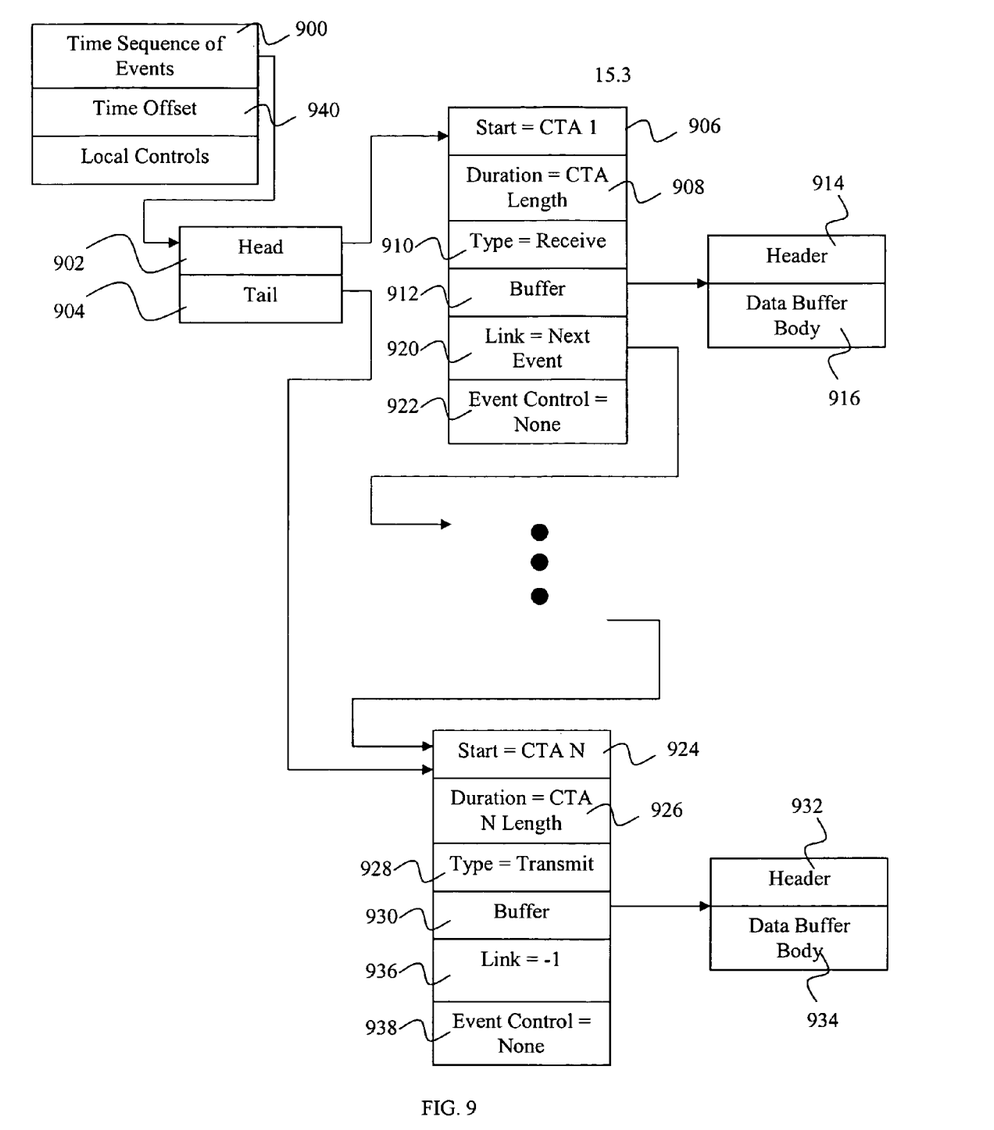
FIG. 9 is a block diagram illustrating the interface information structure for the standard 802.15.3.

FIG. 9 is a block diagram illustrating the interface information structure for the standard 802.15.3. Time sequence of events 900 points to event queue descriptor with head 902 and tail 904. Head 902 points to start 906. Start 906 indicates at the start time of the first CTA, CTA 1. Duration 908 is the length of CTA 1. Type 910 is receive. Type can be any type specified by the beacon information structure. In this embodiment, type could be receive, transmit, and sleep. Buffer 912 points to header 914 and data buffer body 916. Link event 920 points to the next event. The next event is CTA 2 (not shown). There is a null entry for Event control 922. Tail 904 points to start 924. Start 924 indicates at the start time of the last CTA, CTA N. Duration 926 is the length of CTA N. Type 928 is transmit. Buffer 930 points to header 932 and data buffer body 934. Link event 936 is −1 indicating that this is the last event descriptor. There is a null entry for Event control 938.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A MAC layer system comprising:
an upper MAC portion wherein the upper MAC portion is dependent on a MAC protocol, and
a lower MAC portion wherein the lower MAC portion is independent of the MAC protocol, wherein the upper MAC portion communicates information to the lower MAC portion using an information structure including a time offset, and wherein the lower MAC interfaces with a physical layer device compatible with a wireless personal area network.

2. A MAC layer system as in claim 1, wherein the upper MAC portion functionality is performed using software.

3. A MAC layer system as in claim 1, wherein the lower MAC portion functionality is performed using hardware.

4. A MAC layer system as in claim 1, wherein the upper MAC portion communicates information to the lower MAC portion via a memory interface.

5. A MAC layer system as in claim 1 wherein the upper MAC portion communicates information to the lower MAC portion which includes control information and data information.

6. A MAC layer system as in claim 1, wherein the upper MAC portion communicates information to the lower MAC portion using an information structure.

7. A MAC layer system as in claim 1, wherein the upper MAC portion communicates information to the lower MAC portion using an information structure including a time sequence of events.

8. A MAC layer system as in claim 1, wherein the upper MAC portion communicates information to the lower MAC portion using an information structure including a local control.

9. A MAC layer system as in claim 1, wherein the upper MAC portion communicates information to the lower MAC portion using an information structure including an event queue descriptor.

10. A MAC layer system as in claim 1, wherein the upper MAC portion communicates information to the lower MAC portion using an information structure including an event queue descriptor that includes a tail and a head.

11. A MAC layer system as in claim 1, wherein the upper MAC portion communicates information to the lower MAC portion using an information structure including an event descriptor.

12. A MAC layer system as in claim 1, wherein the upper MAC portion communicates information to the lower MAC portion using an information structure including an event descriptor that includes a start.

13. A MAC layer system as in claim 1, wherein the upper MAC portion communicates information to the lower MAC portion using an information structure including an event descriptor that includes a duration.

14. A MAC layer system as in claim 1, wherein the upper MAC portion communicates information to the lower MAC portion using an information structure including an event descriptor that includes a type.

15. A MAC layer system as in claim 1, wherein the upper MAC portion communicates information to the lower MAC portion using an information structure including an event descriptor that includes a buffer.

16. A MAC layer system as in claim 1, wherein the upper MAC portion communicates information to the lower MAC portion using an information structure including an event descriptor that includes a buffer and wherein the a portion of the buffer is made available between the upper MAC portion and the lower MAC portion before the entire data information structure has been filled to enable timely processing.

17. A MAC layer system as in claim 1, wherein the upper MAC portion communicates information to the lower MAC portion using an information structure including an event descriptor that includes a link.

18. A MAC layer system as in claim 1, wherein the upper MAC portion communicates information to the lower MAC portion using an information structure including an event descriptor that includes an event control.

19. A method for splitting a MAC layer system comprising:
providing an upper MAC portion wherein the upper MAC portion is dependent on a MAC protocol, and
providing a lower MAC portion wherein the lower MAC portion is independent of the MAC protocol, wherein the upper MAC portion communicates information to the lower MAC portion using an information structure including a time offset, and wherein the lower MAC interfaces with a physical layer device compatible with a wireless personal area network.

* * * * *